(12) United States Patent
Esham

(10) Patent No.: US 6,412,444 B1
(45) Date of Patent: Jul. 2, 2002

(54) ANIMAL ANCHOR AND TETHER SYSTEM

(76) Inventor: Vaughn P. Esham, 20762 Wesley Church Rd., Seaford, DE (US) 19973

( * ) Notice: Subject to any disclaimer, the term of this patent is extended or adjusted under 35 U.S.C. 154(b) by 0 days.

(21) Appl. No.: 09/878,355

(22) Filed: Jun. 12, 2001

Related U.S. Application Data

(60) Provisional application No. 60/212,838, filed on Jun. 21, 2000.

(51) Int. Cl.[7] .............................. A01K 3/00; E02D 3/74
(52) U.S. Cl. ......................... 119/786; 119/784; 52/155
(58) Field of Search .................... 119/786, 787, 119/788, 769, 784, 704, 791; 52/155, 156; 135/118

(56) References Cited

U.S. PATENT DOCUMENTS

| | | | | |
|---|---|---|---|---|
| 209,090 A | * | 10/1878 | Thomas et al. .............. | 119/788 |
| 466,529 A | * | 1/1892 | Rooney ........................ | 119/784 |
| 623,596 A | * | 4/1899 | Covington ................... | 119/784 |
| 1,448,808 A | * | 3/1923 | McGowan ................... | 119/786 |
| 1,563,212 A | * | 11/1925 | Madiar ........................ | 119/784 |
| 2,145,991 A | * | 2/1939 | Nichols ......................... | 111/49 |
| 2,671,981 A | * | 3/1954 | Williams ..................... | 119/786 |
| 2,941,504 A | * | 6/1960 | Supowitz ..................... | 119/712 |
| 2,956,543 A | * | 10/1960 | Kirk ............................ | 119/662 |
| 4,003,169 A | * | 1/1977 | Young, II ..................... | 24/269 |
| 4,947,801 A | * | 8/1990 | Glass .......................... | 119/771 |
| 5,497,732 A | * | 3/1996 | Moffre et al. ................ | 119/784 |
| 5,718,190 A | * | 2/1998 | Tinker ......................... | 119/771 |

* cited by examiner

*Primary Examiner*—Yvonne R. Abbott
(74) *Attorney, Agent, or Firm*—Breiner & Breiner, L.L.C.

(57) ABSTRACT

An anchor and tether animal restraining device having a line extending between a pair of anchors. At least one of the anchors is an angle-spike anchor having an angled portion for providing control over the line and, further, a smooth walled enclosure partially covering a base portion of the angle portion for preventing entanglement of a leash which attaches an animal, such as a dog, to the device.

18 Claims, 2 Drawing Sheets

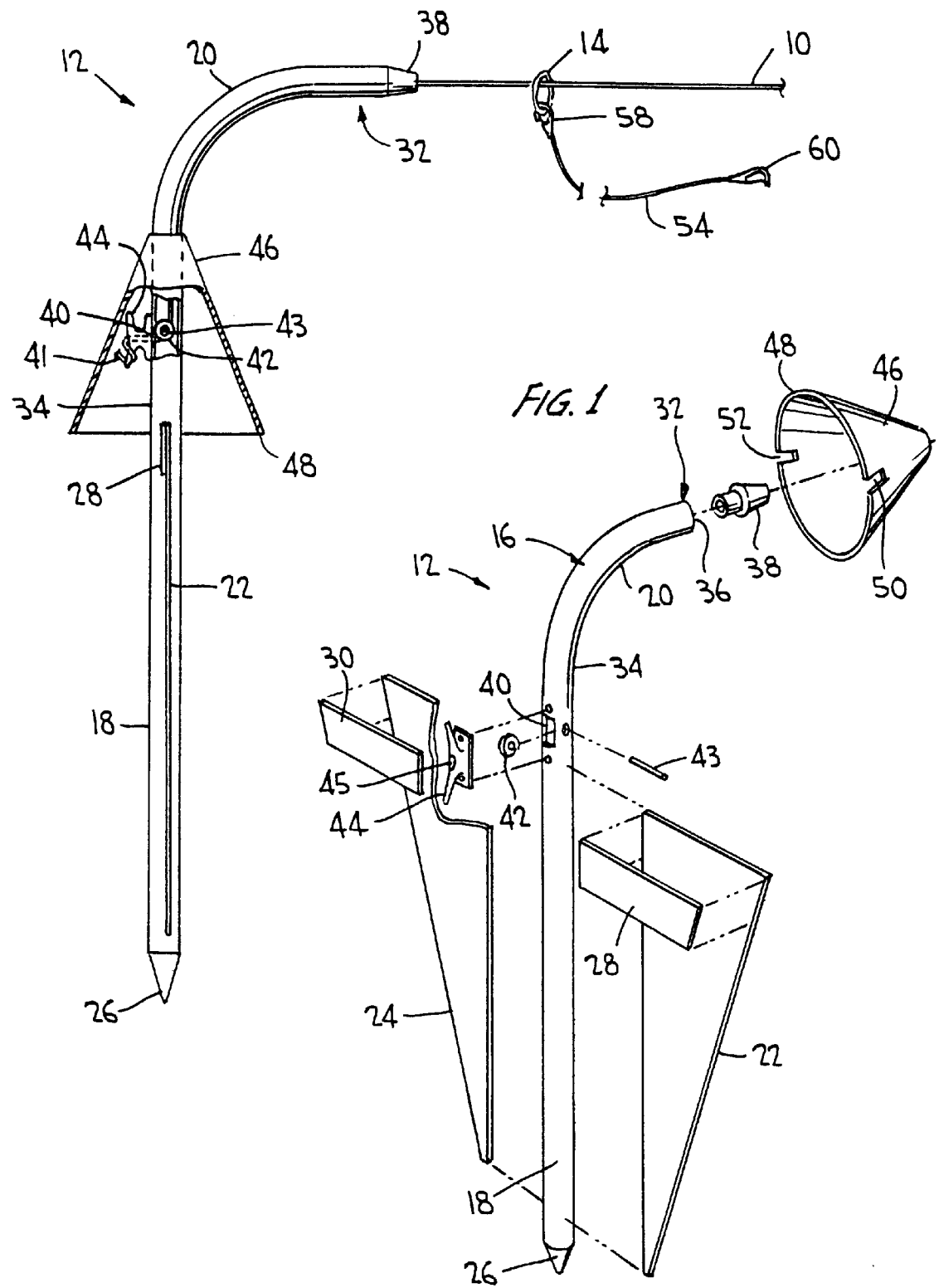

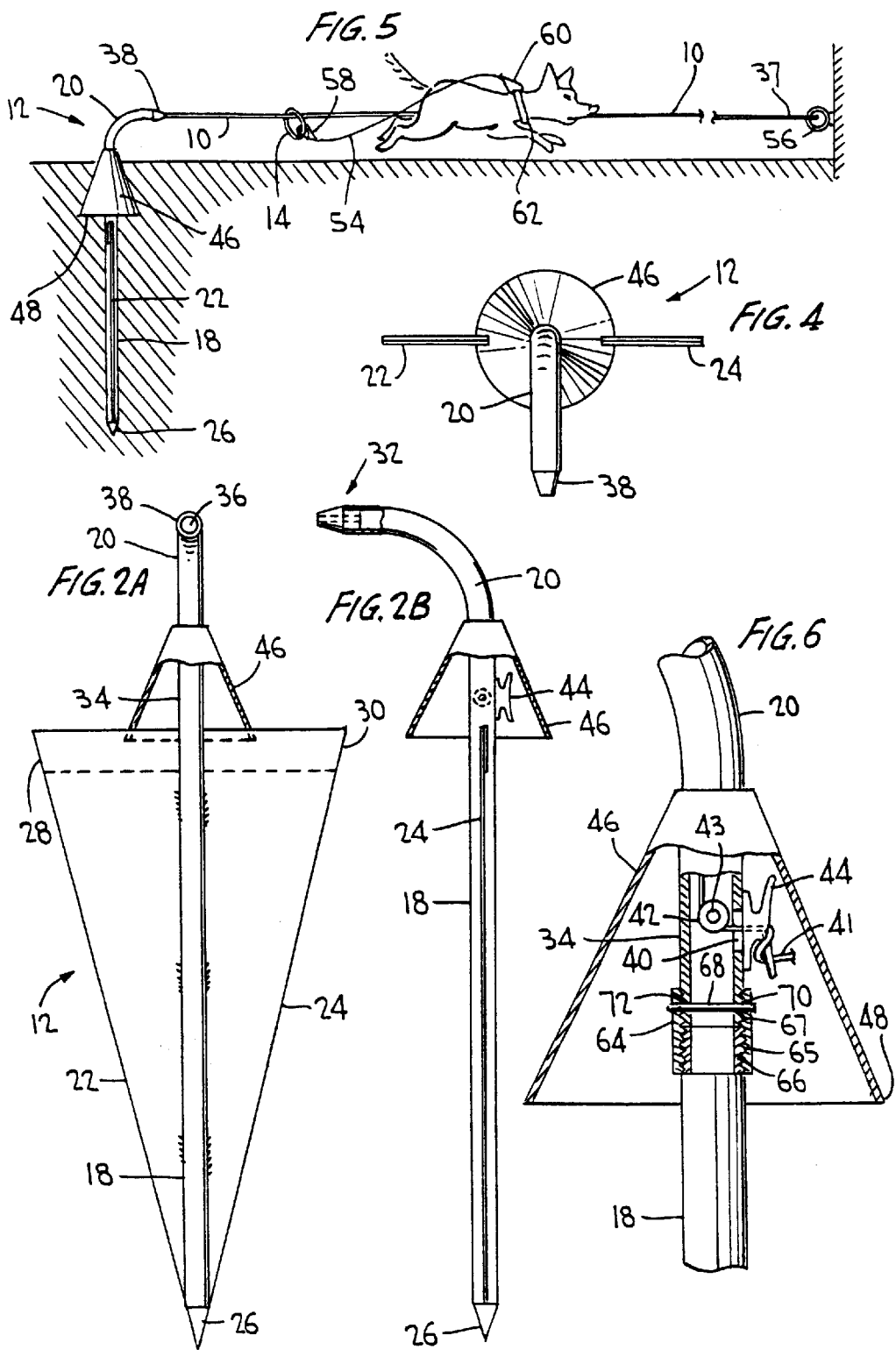

ANIMAL ANCHOR AND TETHER SYSTEM

This application claims the benefit under 35 U.S.C. 119(e) of U.S. Provisional Application No. 60/212,838, filed Jun. 21, 2000.

FIELD OF THE INVENTION

The invention relates to an animal restraining device, and more particularly, to an anchor and tether system having a line extended between a pair of anchors wherein at least one of the anchors is an angle-spike anchor having an upper angled portion for providing control over the extension of the line and a smooth walled enclosure partially covering the base of the angled portion for preventing entanglement of a leash which attaches an animal, most beneficially a canine, to the line. While the invention is described for use in relation to a dog, it is necessarily understood that the invention may be utilized with other animals, such as a cat, horse or the like. A dog is utilized for ease of description and since dogs generally provide for the majority of use of a system as described.

BACKGROUND OF THE INVENTION

It is a well known problem that when an animal, such as a dog or horse, is tied to a structure, such as a tree or a stake, the animal will likely entangle itself about the structure. Entanglement limits the mobility of the animal and increases the probability that the animal will be choked or injured.

Devices having a corkscrew-type structure which are screwed into the ground are known for restraining an animal. However, such devices are easily pulled free from the ground by the animal. Further, the exposed portion of such devices allows for tangling of the leash which attaches the animal to the device.

Various canine anchor and tether systems are known in the art. For example, U.S. Pat. No. 3,395,675 to Fowlkes discloses a dog restraining device having a line extended between a pair of upright, straight poles. The dog is fastened to the line by a solid elongated member which has a length of chain attached to each end. The free end of one length of chain is fastened to the collar of the dog, and the free end of the other chain is attached to an enlarged ring circumposed about the line. The solid elongated member permits the dog to have a limited range of motion about the device while protecting the dog from becoming entangled in the chain. However, the manner in which the line is attached to the poles, in conjunction with the design of the poles, restricts the movement of the dog around the poles. Further, the solid elongated member, which prevents the dog from becoming entangled with a conventional leash, as well as the poles, severely limits the dog's movement thereabout.

The present invention provides an improved anchor and tether system which alleviates the shortcomings of known animal restraint systems.

OBJECTS AND SUMMARY OF THE INVENTION

A primary object of the invention is to provide an anchor and tether system which eliminates entanglement by a leash attached to a dog with an anchor as the dog moves about an area.

A further primary object of the invention is to provide an anchor and tether system that affords a dog unhindered movement about an area.

A further primary object of the invention is to provide an anchor and tether system for securely restraining small and large dogs alike.

Another object of the invention is to provide an anchor and tether system having a means of adjusting the length of a line extended between a pair of anchors.

A further object of the invention is to provide an anchor and tether system that allows a dog to move 360 degrees around an anchor without a leash attached to the dog becoming entangled with the anchor.

The objects of the invention are accomplished by providing a pair of anchors, wherein at least one of the anchors is an angle-spike anchor, which includes a rod having a lower portion for being driven into the ground and an upper angled portion for providing control over the extension of a line between the anchors. The lower portion of the rod includes a pair of triangular-shaped spikes attached at right angles to the rod for securing and stabilizing the angle-spike anchor in the ground. The upper angled portion has a free outer end and a base portion adjacent the tops of the spikes. A ring having a diameter greater than the diameter of the line is circumposed about line so that the ring can easily slide across the line.

The upper angled portion includes a first opening in the outer free end and a second opening in the base portion. A cord wheel is positioned inside of the base of the angled portion tangentially adjacent to the second opening for facilitating movement of the line through the angled portion. A cleat is attached to the base of the angled portion near the second opening.

A substantially smooth walled enclosure, preferably tapered walled such as a funnel-shaped cone or domed enclosure, is situated about the base of the angled portion so that the wide part of the cone is positioned over the second opening and cleat. The smooth walled enclosure serves to protect the base of the angled portion and other adjacent components from the environment and dog as well as provide a substantially smooth surface to prevent entanglement of the leash with the anchor.

In use, the enclosure is removed from the base of the angled portion and the line is threaded into the second opening, around the cord wheel and out through the outer free end. The ring is placed about the line, and the free end of the line is attached to another end attachment or anchor. The tension and length of the line is set by securing excess line extending through the second opening about the cleat. The enclosure is then placed back over the base of the angled portion and, thus, over the cleat.

A leash is attached to the ring at one end and to a dog at the other end. As the dog moves around the area defined by the anchor and tether system, the ring moves along the line allowing the dog to move about the area without entanglement. dr

BRIEF DESCRIPTION OF THE DRAWINGS

FIG. 1 is an exploded perspective view of an angle-spike anchor in accordance with a first embodiment of the present invention.

FIG. 2 is a front view, and FIG. 2B a side view, of the angle-spike anchor of FIG. 1.

FIG. 3 is a partial, cross-sectional side view of an anchor and tether system in accordance with the first embodiment of the present invention.

FIG. 4 is a top plan view of the angle-spike anchor of FIG. 1.

FIG. 5 is a side view of an anchor and tether system in accordance with the present invention shown in use.

FIG. 6 is a cross-sectional side view of an angle-spike anchor in accordance with a second embodiment of the present invention.

DETAILED DESCRIPTION AND PRESENTLY PREFERRED EMBODIMENTS

The preferred embodiment of the canine anchor and tether system is shown in FIGS. 1 through 5. An alternative embodiment of the invention is illustrated in FIG. 6.

The canine anchor and tether system generally includes a pair of anchors between which a line 10, such as a quarter inch nylon rope or a coated steel cable, is extended. At least one anchor is an angle-spike anchor 12 adapted to be inserted and retained in the ground. A ring 14, preferably constructed of nylon coated metal, having a diameter greater than the diameter of line 10 is circumposed about line 10.

More particulary, the anchor and tether system includes an angle-spike anchor 12 which includes a continuous rod 16 having a substantially straight lower portion 18 for being driven into the ground and an upper angled portion 20 for providing control over the extension of line 10 between the anchors. Rod 16 can be constructed of any rigid tubing material capable of being driven into the ground and withstanding deformation which can be caused by the type of animal attached to the anchor and tether system. Preferably, for dogs, rod 16 is constructed of metal tubing and is thirty-two inches in length.

Lower portion 18 of rod 16 includes a pair of triangular shaped spikes 22, 24 attached at right angles to the rod 16 for securing and stabilizing angle-spike anchor 12 in the ground. Spikes 22, 24 are attached to rod 16 by welding or any other suitable means. The pair of spikes can be formed as a singular unitary piece. For example, a triangular sheet of metal can be welded at its center to rod 16 such that a spike is effectively provided on each side of rod 16. The triangular sheet of metal can include an outward curve in the center which complements the shape of rod 16 so that it can be fitted thereto. Formed at the lower end of lower portion 18 is a pointed end 26 which facilitates insertion of angle-spike anchor 12 into the ground.

Angle-spike anchor 12 can be inserted in the ground using a nylon or rubber hammer or the like by striking spikes 22, 24. To prevent deformation of spikes 22, 24 during insertion of angle-spike anchor 12, reinforcing plates 28, 30 are welded horizontally across a portion of spikes 22, 24, respectively, opposite pointed end 26. Reinforcing plates 28, 30 provide rigidity to spikes 22, 24. Additional triangular-shaped spikes can be attached to rod 16 if necessary to provide additional stability and support.

Angled portion 20 includes a free outer end 32 and a base portion 34 opposite the free outer end 32. A first opening 36 through which line 10 exits when the anchor and tether system is in use is located in outer free end 32. A tapered bushing 38, preferably of nylon or other smooth faced material, having a passageway therethrough is inserted into first opening 36 in order to better control and prevent wearing of line 10 as it is extended and withdrawn from angled portion 20. A second opening 40 is located in base portion 34 through which an end 41 of line 10 exits when the anchor and tether system is in use.

A cord wheel 42 is rotatably secured by a pin 43 inside of base portion 34 of angled portion 20 tangentially adjacent to second opening 40 for facilitating movement of line 10 within angled portion 20 between openings 36 and 40. The tangential alignment and position of cord wheel 42 in relation to second opening 40 is such that when line 10 extends through first opening 36 and angled portion 20 to exit through second opening 40, line 10 extends around the lower edge of cord wheel 42 causing cord wheel 42 to rotate as line 10 is withdrawn or extended through angled portion 20. Accordingly, cord wheel 42 facilitates movement of line 10 through angle portion 20. Additionally, once line 10 is in place, cord wheel 42 serves as a smooth holding surface for line 10.

A cleat 44 having a passageway 45 therethrough is attached to base portion 34 over second opening 40 so that end 41 of line 10 exits through cleat 44. To secure and maintain the length of line 10, end 41 of line 10 is wrapped around and tied off to cleat 44. Alternatively, cleat 44 can be attached to base portion 34 substantially near second opening 40 and end 41 of line 10 merely wrapped around cleat 44.

A smooth walled enclosure, illustrated as funnel-shaped cone 46, having a wide portion 48 is circumposed about base portion 34 of angled portion 20 so that cone 46 is positioned over second opening 40 and cleat 44. A pair of notches 50, 52 are preferably formed in the outer edge of wide portion 48 for receiving the top edge of each of spikes 22, 24 so that when spikes 22, 24 are inserted into the ground, so is the edge of wide portion 48 of cone 46. Cone 46 is then held securely in place. Cone 46 serves to protect base portion 34 and components present with respect thereto from the environment and a dog as well as to provide a smooth exterior surface without exposed edges to prevent entanglement of a leash 54 attached to the dog with angle-spike anchor 12.

In use, line 10 extends out from first opening 36 of angle-spike anchor 12, and ring 14 is circumposed about line 10. A leading end 37 of line 10 is attached to an attachment 56 of a building structure such as a ring, steps, foundation, or the like, or another angle-spike anchor 12.

To adjust the tension or length of line 10, cone 46 is slid upwardly from base portion 34 to expose second opening 40 and/or cleat 44. End 41 of line 10 is either fed through second opening 40 and/or cleat 44 to lengthen line 10 or withdrawn from second opening 40 and/or cleat 44 to shorten line 10. End 41 of line 10 is wrapped around cleat 44 and tied off thereto. Cone 46 is then slid downwardly to cover base portion 34.

Leash 54 has at each end thereof an attachment means 58, 60, such as a conventional swivel snap clip. Leash 54 is attached to ring 14 by clip 58 and to the collar 62 of the dog by clip 60.

As the dog moves around an area covered by the anchor and tether system, ring 14 moves along line 10 allowing the dog to move the length of line 10 without entanglement. No entanglement is present at angle-spike anchor 12 due to cone 46 covering base portion 34 and the components projecting therefrom. Further, the dog can travel 360 degrees around angle-spike anchor 12 without leash 54 becoming wrapped around the anchor. Further, the dog can travel over or under line 10 without hindrance.

FIG. 6 illustrates an alternative embodiment to rod 16. Angled portion 20 and lower portion 18 of rod 16 of the preferred embodiment of the invention can be constructed of separate, noncontinuous portions which are connected to each other by suitable means, for example a threaded coupler 64. More particularly, threaded coupler 64 is attached to a top free end 66 of lower portion 18 which extends above the ground in use which will be complementarily threaded at 65. Threaded coupler 64, or other coupling means, can be fixedly attached to lower portion 18 by welding or any other suitable bonding means. Angled portion 20 is threaded at 67 in its base portion 34 to coupler 64. A pin 68 preferably is inserted through a first hole 70 in coupler 64 and into a second hole 72 in angled portion 18 in order to secure angled portion 18 in position with respect to coupler 64. Pin 68, however, can be removed if it is desired to disconnect the joined components.

As will be apparent to one skilled in the art, various modifications can be made within the scope of the aforesaid description. Such modifications being within the ability of one skilled in the art form a part of the present invention and are embraced by the appended claims.

It is claimed:

1. An animal restraint device comprising:

a pair of anchors, a line for attachment to and extending between said pair of anchors, and a ring circumposed about said line having a diameter greater than the diameter of said line, wherein at least one of said pair of anchors is an angle-spike anchor comprising a rod having a lower portion constructed and arranged for driving into the ground and an upper angled portion having a free outer end and a base portion opposite said free outer end through which the line extends, and wherein said lower portion of said rod includes at least two triangular-shaped spikes attached to the lower portion and constructed and arranged to secure and stabilize said angle-spike anchor in the ground, and wherein a substantially smooth walled enclosure is circumposed about said base portion of said upper angled portion.

2. An animal restraint device in accordance with claim 1 wherein each of said at least two triangular-shaped spikes includes a rectangular reinforcing plate.

3. An animal restraint device in accordance with claim 1 further comprising a tapered bushing inserted into said free outer end.

4. An animal restraint device in accordance with claim 1 wherein a cord wheel is positioned inside said base portion of said upper angled portion.

5. An animal restraint device in accordance with claim 1 wherein a cleat is attached to said base portion of said upper angled portion for securing said line.

6. An animal restraint device in accordance with claim 1 further comprising a leash attachable to said ring.

7. An animal restraint device in accordance with claim 1 wherein said smooth walled enclosure includes at least two notches for receiving a top edge of said at least two triangular-shaped spikes.

8. An animal restraint device in accordance with claim 1 where in s aid smooth walled enclosure is a funnel-shaped cone.

9. An animal restraint device in accordance with claim 1 wherein said at least two triangular-shaped spikes are a unitary structure.

10. An animal restraint device comprising:

a pair of anchors, with a line extending therebetween, wherein at least one of said pair of anchors is an angle-spike anchor having a rod with a lower portion constructed and arranged for driving into the ground and an upper angled portion having a free outer end and a base portion opposite said free outer end, at least two triangular-shaped spikes attached at right angles to said lower portion of said rod, a smooth walled enclosure circumposed about said base portion of said upper angled portion, and a ring circumposed about said line having a diameter greater than the diameter of said line, wherein said upper angled portion includes a first opening in said outer free end and a second opening in said base portion, a cord wheel positioned inside of said base portion, and a cleat attached to said base portion.

11. An animal restraint device in accordance with claim 1 wherein said rod comprises two individual components, said lower portion and said upper angled portion, and said device further comprises a tubular coupler, wherein a first end of said tubular coupler is attached to said base portion of said upper angled portion and a second end of said coupler is attached to a free end of said lower portion.

12. An animal restraint device according to claim 11 wherein said coupler is threaded and each of said base portion and said free end of said lower portion are complementarily threaded to said coupler.

13. An animal restraint device in accordance with claim 11 further comprising a tapered bushing inserted into said first opening.

14. An animal restraint device in accordance with claim 13 wherein a cord wheel is positioned inside of said base portion.

15. An animal restraint device in accordance with claim 11 wherein a cleat is attached to said base portion.

16. An animal restraint device in accordance with claim 11 where in s aid smooth walled enclosure is circumposed about said coupler.

17. An animal restraint device in accordance with claim 16 wherein said smooth walled enclosure includes at least two notches for receiving a top edge of said at least two triangular-shaped spikes.

18. Animal restraint device in accordance with claim 11 wherein said smooth walled enclosure is a funnel-shaped cone.

* * * * *

UNITED STATES PATENT AND TRADEMARK OFFICE
CERTIFICATE OF CORRECTION

PATENT NO.   : 6,412,444 B1
DATED        : July 2, 2002
INVENTOR(S)  : Vaughn P. Esham It is certified that error appears in the above-identified patent and that said Letters Patent is hereby corrected as shown below:

Column 2,
Bridging lines 49 and 50, "entanglement. dr" should read -- entanglement. --

Column 5,
Line 48, "s aid" should read -- said --.

Column 6,
Line 21, "claim 1" should read -- claim 10 --.

Signed and Sealed this

First Day of October, 2002

*Attest:*

JAMES E. ROGAN
*Attesting Officer*   *Director of the United States Patent and Trademark Office*